United States Patent [19]
Johanson

[11] 3,817,216
[45] June 18, 1974

[54] FEED DISTRIBUTING APPARATUS

[76] Inventor: Clarence Ruben Johanson, Box 232, Underwood, Minn.

[22] Filed: Jan. 12, 1973

[21] Appl. No.: 323,456

[52] U.S. Cl. ............................ 119/52 AF, 119/52 B
[51] Int. Cl. ............................................ A01k 05/02
[58] Field of Search ............ 119/52 AF, 52 B, 56 R, 119/56 A, 57

[56] References Cited
UNITED STATES PATENTS

| | | | |
|---|---|---|---|
| 3,101,070 | 8/1963 | Cordis | 119/52 AF |
| 3,191,581 | 6/1965 | Braham | 119/52 AF |
| 3,254,729 | 6/1966 | Behlen | 119/56 R X |
| 3,279,436 | 10/1966 | Haen et al. | 119/56 R |
| 3,310,033 | 3/1967 | Eichholz | 119/56 R |
| 3,342,165 | 9/1967 | Szymanski | 119/56 R |
| 3,688,745 | 9/1972 | Stefan | 119/52 AF |
| 3,727,584 | 4/1973 | Permann | 119/56 R |

Primary Examiner—James H. Czerwonky
Attorney, Agent, or Firm—Williamson, Bains & Moore

[57] ABSTRACT

A feed distribution apparatus comprises a plurality of shelves which receives particulate animal stock feeds such as silage from a hopper or the like. Metering troughs are positioned laterally adjacent the shelves and receive the feed material from the shelves. An endless conveyor having paddle elements moves the material along the shelves so that the metering troughs are progressively filled laterally from a point adjacent the hopper. Suitable doors which normally close the bottom of the metering troughs may be selectively opened and closed to permit discharge of metered amounts of feed material into a plurality of animal feeding troughs.

9 Claims, 10 Drawing Figures

PATENTED JUN 18 1974

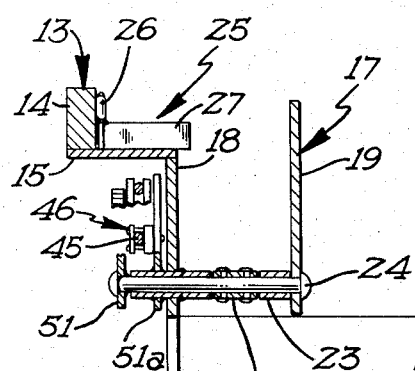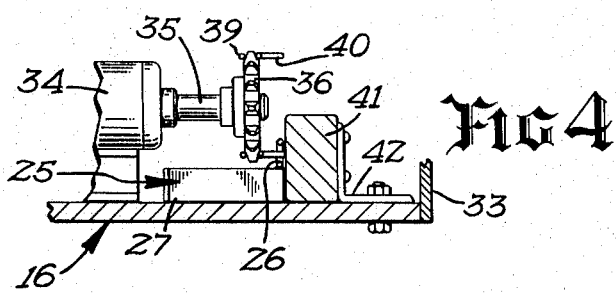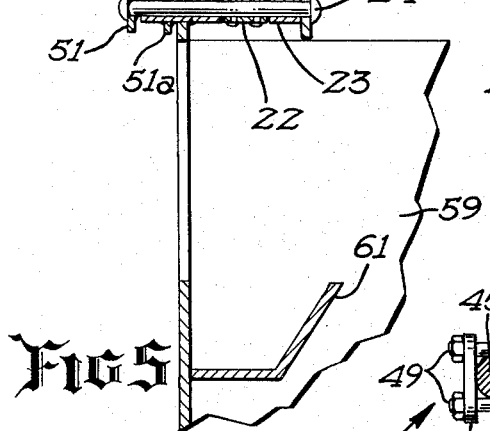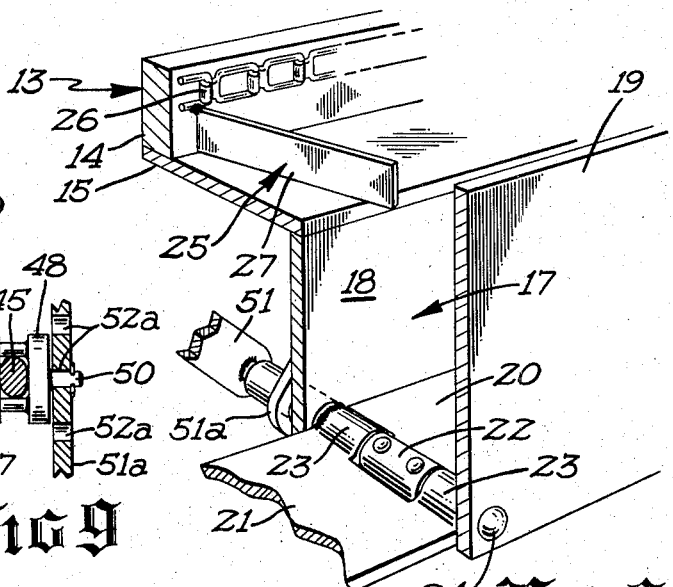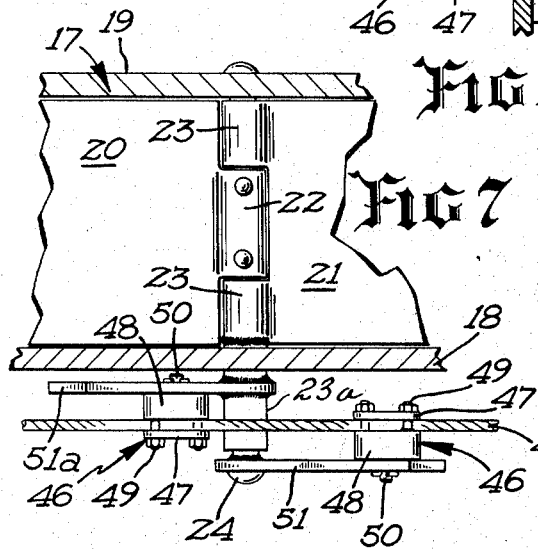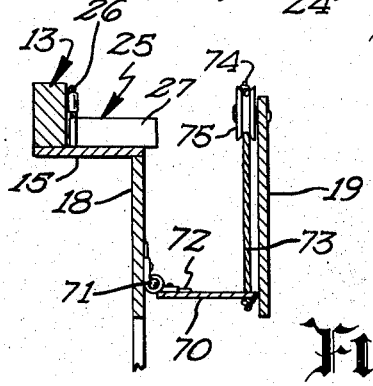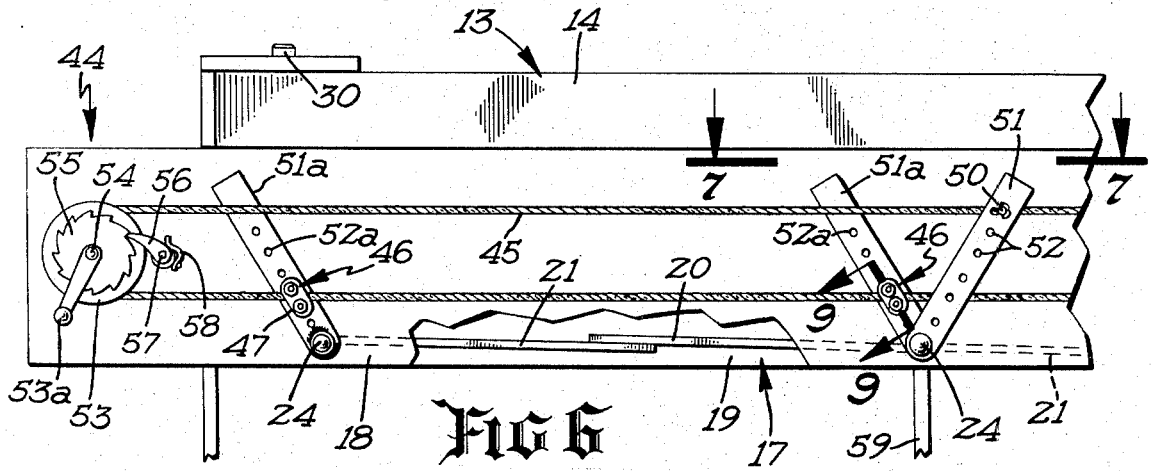

FEED DISTRIBUTING APPARATUS

SUMMARY OF THE INVENTION

This invention relates to a feed distribution apparatus in which particulate animal stock feed is conveyed, measured and discharged into a plurality of animal troughs for comsumption by stock animals.

In certain prior art feed distribution systems, the animal feed is discharged from a source into the animal feeding troughs and the feed is conveyed through the troughs by conveyor means which are located usually along the bottom of the feed troughs. This type of prior art device is unable to accurately meter or measure the animal feed so that each animal is given a predetermined amount of feed.

It is therefore a general object of this invention to provide an animal feed distribution apparatus which conveys, measures and discharges animal feed, such as silage and the like into a plurality of animal feed troughs. The apparatus includes an endless conveyor which conveys the particulate feed material from distribution shelves into the metering troughs from which the feed is discharged into the feeding troughs. The conveyor comprises an endless conveyor chain having paddle elements secured thereto which move the feed along the distribution shelves and progressively fills the metering troughs. These metering troughs are provided with shiftable closure members which close the lower portions thereof and when shifted to an open position permit the material to be simultaneously discharged into a plurality of animal feeding troughs. Thus the present feed distribution system permits particulate animal feed to be first measured and then simultaneously discharged into a plurality of animal feeding troughs. Because of the sticky properties of certain animal feeds, the feed material tends to adhere to the conveyor chain and drive components of certain prior art devices. This buildup of the material on the conveyor and drive components of prior art devices guite often results in malfunction of these prior art systems.

In the present feed distribution apparatus, a unique chain drive is provided which is arranged and constructed to minimize the occurance of this drive malfunction. These and other objects and advantages of this invention.

BRIEF DESCRIPTION OF THE DRAWINGS

FIG. 4 is a cross sectional view taken approximately along line 4—4 of FIG. 3 and looking in the direction of the arrows, FIG. 5 is a cross sectional view taken approximately along line 5—5 of FIG. 1 and looking in the direction of the arrows, FIG. 6 is a fragmentary elevational view of one corner of the apparatus, FIG. 7 is a cross sectional view taken approximately along 7—7 of FIG. 6 and looking in the direction of the arrows, FIG. 8 is a fragmentary perspective view of a portion of the apparatus illustrating certain details of construction thereof, FIg. 9 is a cross sectional view taken approximately along line 9—9 of FIG. 6 and looking in the direction of the arrows, FIG. 10 is a cross sectional view similar to FIG. 5 but illustrating a modified form of the invention.

DETAILED DESCRIPTION

Figure 1:
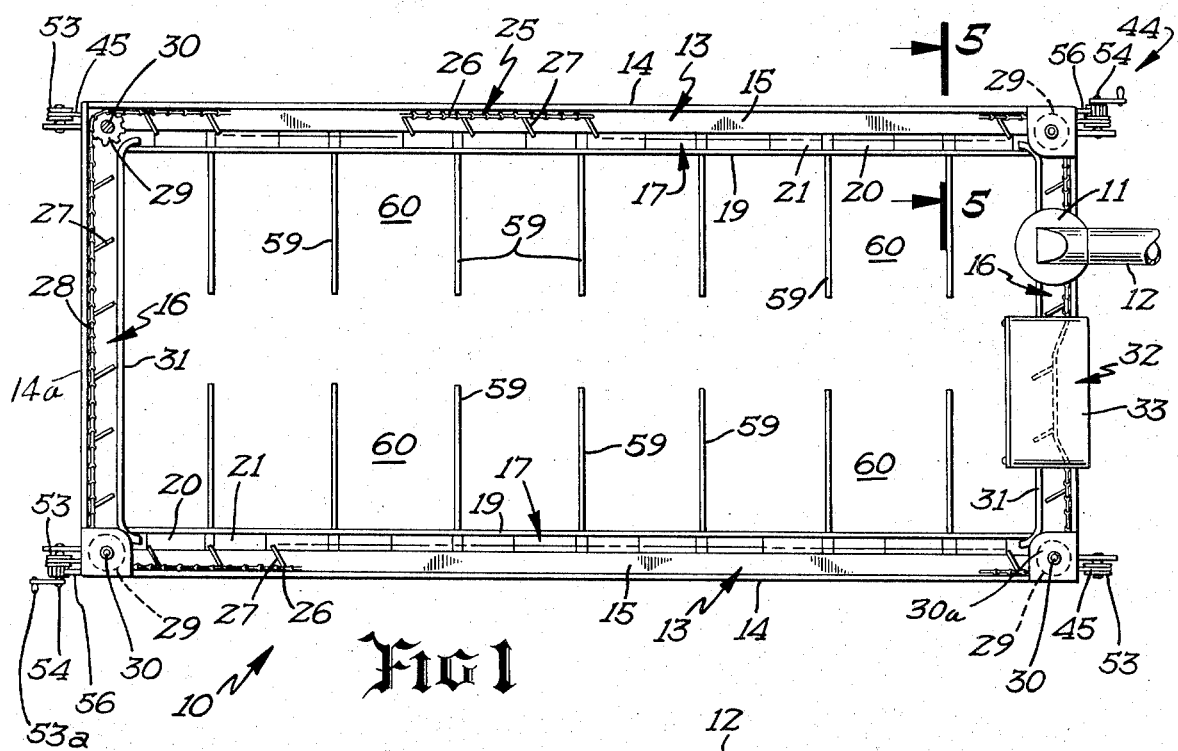
FIG. 1 is a top plan view of the novel feed distribution apparatus.
Figure 2:
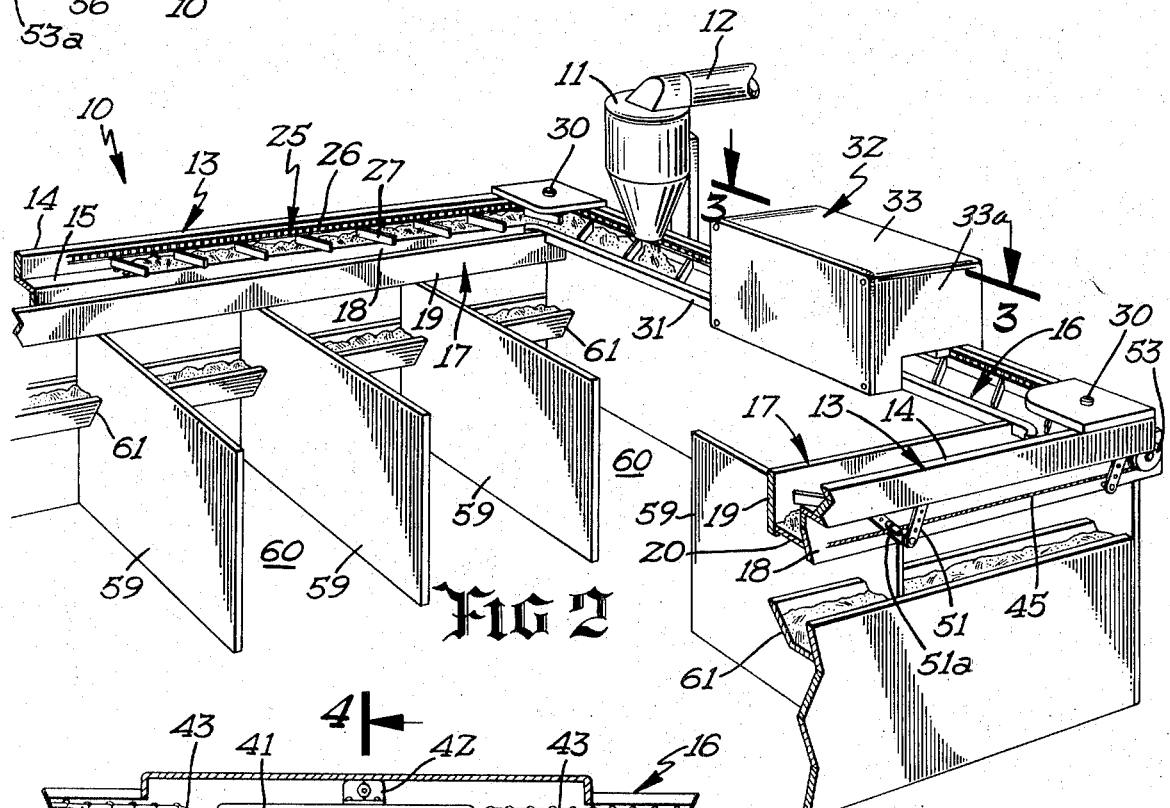
FIG. 2 is a fragmentary perspective view of a portion of the feed distribution apparatus.

Referring now to the drawings and more specifically to FIGS. 1 and 2, it will be seen that one embodiment of the novel feed distribution apparatus, designated generally by the reference numeral 10 is thereshown. The feed distribution apparatus 10 is adapted to receive animal feed such as silage or the like from a source and to convey the material to metering troughs where the feed material is measured and is thereafter simultaneously discharged into feeding troughs such as those used for feeding cattle. Thus it will be seen that the particulate animal feed is discharged from a discharge hopper 11 which receives the feed material from a supply conduit having an auger type conveyor therein.

The feed distribution apparatus 10 includes a horizontally oriented distribution shelf structure 13 which may be formed of any suitable rigid material such as wood, metal or the like. The shelf structure 13 is of generally rectangular configuration and includes a pair of spaced apart substantially parallel longitudinal shelf sections 15 which are rigidly interconnected to spaced apart substantially parallel transverse shelf sections 16. Each of the longitudinal shelves 15 has an elongate vertical wall 14 fixedly connected to the outer edge thereof and projecting upwardly therefrom while each of the transverse shelves 16 also has a vertical wall 14a rigidly affixed thereto and projecting upwardly from the outer edge thereof.

Each of the longitudinal shelves 15 has an elongate upwardly opening metering trough 17 positioned adjacent and below the inner edge thereof. In the embodiment shown, the metering troughs 17 each includes an outer vertical wall 18 which is fixedly connected to the associated longitudinal shelves 15 and depends therefrom. It will be noted that each metering trough also includes an inner vertical wall 19 which projects upwardly beyond the upper surface of the associated longitudinal shelf 15, as best seen in FIG. 5. The lower portion of the metering troughs 17 are closed by suitable closure or door means which may be operated to permit controlled discharge of the animal feed within the troughs.

This closure or door means comprises a plurality of doors which are arranged in pairs and which are vertically swingable between opened and closed positions. Each pair includes a door 20 and a door 21 having end portions which are disposed in overlapping relation and which cooperate with each other to close a longitudinal portion of the associated metering trough. In this respect, it will be noted that each door 20 has a sleeve element 22 integrally formed with one end thereof, and this sleeve element 22 is positioned around and secured by suitable bolts or the like to a hinge pin 24. It will be noted that each hinge pin 24 is journaled in the inner and outer walls of the associated metering troughs whereby when the hinge pin 24 is revolved, the associated door 20 will be moved therewith. Each door 21 is also provided with a pair of sleeve elements 23 which are positioned on opposite sides of the hinge pin 24, and the outermost sleeve element 23 is rigidly connected to a hinge sleeve 23a which projects through an opening in the outer wall 18 of the associated metering trough.

It will therefore be seen that when the hinge sleeve 23a is revolved, the door 21 will be revolved or swung therewith. Thus it will be seen that each pair of doors is pivotable about a horizontal axis which extends transversely of the associated longitudinal metering trough.

It is pointed out that the amount of material contained in each portion of the metering trough closed by a pair of doors 20 and 21 corresponds to the amount of feed material to be discharged into a single feeding trough in a manner to be described more fully hereinbelow.

Means are provided for conveying the animal feed to the metering trough to progressively fill the troughs and this means includes an endless conveyor 25 which is comprised of an endless chain 26. The endless chain 26 is positioned above and closely adjacent the distribution shelf structure and is provided with a plurality of generally vertically oriented substantially flat paddle elements 27 which are normally oriented in angular relation with respect to the vertical walls 14. It will be noted that each paddle element has a length dimension which is slightly greater than the width dimension of the longitudinal shelf sections 15.

The endless chain conveyor 26 is trained about horizontal oriented idler sprockets 29 whose axles 30 are vertically arranged, the sprockets being located at the corners of the feed distribution apparatus as best seen in FIGS. 1 and 2. It will also be noted that the upper end of each sprocket axle 30 is journalled in a horizontally oriented mounting plate 30a, four such plates being provided. It will further be noted that an inner vertical wall 31 is affixed to the inner edge of each transverse shelf section 16 and projects upwardly therefrom to permit the particulate animal feed to be transferred from one longitudinal shelf section 14a to the other.

Means are provided for driving the conveyor 25 and this means comprises a drive mechanism 32 which includes a housing 33 which is positioned around one of the transverse shelf sections 16. The housing 33 is of rectangular configuration and the end walls 33a thereof have openings therein through which the conveyor 25 passes. An electric motor 34 is positioned interiorly of the housing 33 and the output shaft 35 of the motor has an drive sprocket 36 affixed thereto for rotation therewith. An idler sprocket 37 is also provided and is spaced from the drive sprocket 36 and is mounted on an idler shaft 38. The idler shaft 38 is journalled in suitable bearings and an endless drive chain 39 is trained about the drive sprocket 36 and the idler sprocket 37.

Figure 3:
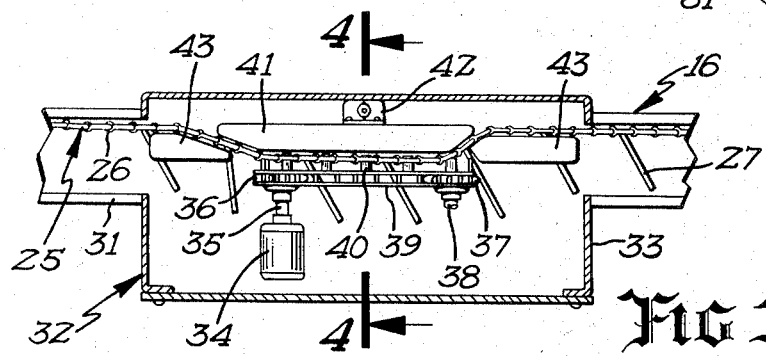
FIG. 3 is a cross sectional view taken approximately along line 3—3 of FIG. 2 and looking in the direction of the arrows.

The drive chain 39 is provided with a plurality of drive elements 40 which are affixed to certain links of the drive chain 39 and which project laterally therefrom as best seen in FIGS. 3 and 4. These drive elements 40 are of a size to project through the openings defined in each chain link of the endless conveyor chain 26 so that the endless chain 26 is driven by the drive chain 39. In this regard, the endless chain 26 is guided out of its straight line transverse run by guide element 41 which is mounted within the housing 33 by a suitable mounting bracket 42. The guide element 41 as shown has a length dimension only slightly greater than the length dimension of the drive chain 39 and cooperates with a pair of guide elements 43 to cause the drive chain 26 to move laterally from its normal straight run into close proximal parallel relation with the drive chain 39, as best seen in FIG. 3. With this arrangement, the endless conveyor chain 26 is guided into driven relation with the drive chain 39 and it will be noted that the drive elements 40 on the lower run of the drive chain 39 engage the endless conveyor chain 26. It has been found that even though feed material sticks and accumulates on the conveyor chain and drive mechanism, the drive to the conveyor will not be interrupted. The present drive system also is capable of being readily and easily cleaned.

Means are also provided for selectively opening and closing the doors 20 and 21 and to this end, it will be noted that each metering trough 17 is provided with a door operating mechanism designated generally by the reference numeral 44. Each door operating mechanism 44 includes an endless cable 45 trained about pulleys and clamped by suitable clamps 46 to suitable actuating arms 51 and 51a. Referring now to FIG. 9, it will be seen that each clamp 46 includes an outer clamping plate 47 and an inner clamping plate 48 positioned on opposite sides of the cable and being clamped thereto. Suitable bolts 49 interconnect the inner and outer plates of each clamp together. The inner plate 48 has a pin 50 affixed thereto and projecting therefrom, and the pin 50 is adapted to project through one of the plurality of apertures 52 in each actuating arm 51 or one of the apertures 52a in one of the actuating arms 51a. A suitable cotter pin releasably locks the pin 50 in one of the selected apertures.

Referring now to FIGS. 5 through 8, it will be seen that each hinge pin 24 is rigidly affixed to the lower end of one of the actuating arms 51 whereby swinging movement of each actuating arm causes revolving movement of the associated hinge pin. It will also be noted that each actuating arm 51a is fixedly connected to a hinge sleeve 24a disposed concentrically around the associated hinge pin and which is rigidly connected to the outer most sleeve element 23 of the associated door 21. The sleeve 23a projects exteriorly of the outer wall 18 of the associated metering trough and it will therefore be seen that when the actuating arm 51a is swung in either direction, the hinge sleeve 24a will be revolved. Each cable 45 is trained about a pair of pulleys 53 which are located at opposite ends of each metering trough as best seen in FIG. 1. It will be noted that each of the pulleys 53 are vertically disposed so that the pulley axle 54 of each pulley is horizontally oriented. A ratchet wheel 55 is secured to one of the pulleys 53 of each door operating mechanism and the ratchet wheel is engaged by a suitable pawl 56. The pawl 56 is pivotally mounted by a pivot 57 and is urged into engaging relation with its associated ratchet wheel by a spring 58. A crank arm 53a is connected to that pulley which has the ratchet wheel 55 connected thereto.

To open and close each pair of doors, it will be seen that an operator may revolve the driven actuating pulley 53 for each door operating mechanism 44 in a door opening direction which causes swinging movement of the actuating arms 51 in one direction and swinging movement of the actuating arms 51a in the opposite direction. When this occurs, each pair of doors 21 and 20 will swing downwardly thus allowing the feed material within each metering trough to be discharged through the opened doors.

Referring now to FIGS. 1, 2 and 5, it will be seen that a plurality of vertical walls 59 are provided to define a plurality of stalls 60. The feed distribution mechanism 10 is positioned above the stalls and each stall is provided with a feed trough 61 which as shown is horizontally oriented. It will therefore be seen that when the doors for one metering trough are opened, the feed material will be simultaneously discharged into a plurality of feeding troughs.

In use, the particulate animal feed will be discharged from the discharge hopper 11 and will be discharged directly upon the distribution shelf structure 13. In the embodiment shown, the animal feed is discharged upon one of the transverse shelf sections 16 although the hopper 11 may be located at any desired point. As the material is discharged upon the distribution shelf 13, the material will be moved along the shelf structure by means of the endless conveyor 25. Since the material is being discharged upon a transverse shelf section 16, the material will be moved between the inner and outer vertical wall of the transverse shelf section and will be conveyed to the longitudinal shelf section. The material will be discharged from the longitudinal shelf section 15 into the metering trough until the metering troughs are completely filled.

In this respect, each metering trough will be progressively filled from one end thereof to the other. Referring to FIG. 1, it will be seen that the material discharged from the discharge hopper will be moved by the conveyor 25 to the longitudinal shelf structure (located at the top of FIG. 1) and the material will immediately be discharged into the metering trough as the material is moved along the longitudinal shelf sections. In the embodiment shown, the metering trough illustrated at the top of the page in FIG. 1 will be filled initially from the right side of the drawing progressively to the left. Thereafter, the metering trough illustrated at the lower portion of FIG. 1 will then be filled from the left side to the right. When the metering troughs have been filled, operation of the supply auger in conduit 12 to the discharge hopper may be interrupted and the door operating mechanisms will then be opened to simultaneously discharge the feed material into the feeding troughs.

It is pointed out that the amount of material supported upon each cooperating pair of doors 20 and 21 in a metering trough will be sufficient for a single animal. It will further be seen that by varying the positions at the clamps 46 with respect to the apertures in the associated actuating arms, the position of each pair of doors when in the closed position may be adjusted. Thus the doors 20 may be adjusted so that in the normally closed position, the doors may be declined downwardly or alternatively, may be inclined upwardly. Through this adjustment, the amount of material for each section of the metering trough which discharges into a single feeding trough may be adjusted and predetermined.

Referring now to FIG. 10, it will be seen that a slightly modified form of the metering trough is thereshown. In this respect, the metering trough is identical in construction to that illustrated in the embodiments of FIGS. 1 to 9 except for the door means for closing the lower portion of the metering trough. Each metering trough is provided with a plurality of substantially identical doors 70 which are of elongate construction and each door 70 corresponding in length to the length of a pair of doors 20 and 21. Thus each door 70, when opened, permits the discharge of material therefrom into one of the feed troughs 61. Each door 70 is hingedly connected to the associated outer vertical wall 18 by means of a hinge 71 to permit vertical swinging movement of each door between opened and closed positions. A spring 72 normally urges each door 70 in a downward or open direction.

Each door 70 is apertured and a connecting cable 73 is secured thereto and extends upwardly therefrom and one end of each connecting cable 73 is secured to an actuating cable 74. The actuating cable 74 is trained about a plurality of pulleys 75 which are mounted on the inner surface of the inner wall 19. Although not shown in the drawing, the actuating cable 75 may be tensioned to close the doors by a suitable crank, or alternatively, the cable 75 may be untensioned to allow the doors 70 to swing downwardly in an open position. It is pointed out that each cable 72 may be adjusted with respect to its associated door to permit the disposition of the door 72 to be adjusted in its closed position. In this respect, the doors 70 may be adjusted to inclined upwardly or declined downwardly from the horizontal position. Thus the doors 70 may be adjusted to vary the amount of material to be metered from the metering trough into the feeding troughs.

From the foregoing description, it will be seen that I have provided a novel feed distribution apparatus which permits distribution metering and simultaneous discharge of cattle feed to a plurality of feeding troughs. It will also be noted that my feed distribution system utilizes a unique drive means which minimizes the occurance of a material buildup between the distribution conveyor and the drive mechanism.

Thus it will be seen that I have provided a novel feed distribution system which is not only of simple and inexpensive construction, but one which functions in a more efficient manner than any heretofore known comparable system.

What is claimed is:

1. A feed distributing apparatus adapted to distribute, meter and discharge particulate animal feed into a plurality of animal feeding receptacles, comprising:

a plurality of substantially flat horizontal elongate shelf sections mounted on said apparatus and adapted to receive particulate animal feed thereon from a supply of animal feed, each shelf section including means defining a vertical wall secured thereto adjacent one longitudinal edge thereof and projecting upwardly therefrom, a plurality of similar elongate upwardly opening metering receptacles mounted on said apparatus and each positioned laterally adjacent to and below the other longitudinal edge of a corresponding one of said shelf sections and above the animal feeding receptacles, a plurality of doors mounted on said apparatus and closing the lower end of each metering receptacle, means operatively connected with said doors and being operable to selectively open and close said doors to permit animal feed in said metering receptacles to be discharged by action of gravity into the feed receptacles, endless conveyor means mounted adjacent the shelf sections and including a plurality of spaced apart conveyor elements connected thereto and being positioned upon and longitudinally movable along the surface of the shelf sections to discharge material laterally from each shelf section progressively along the entire length of said other longitudinal edge thereof and into the metering receptacles and to progressively fill the metering receptacles longitudinally from one end thereof to the other, and drive means mounted on said apparatus and drivingly engaging said conveyor means for driving the latter.

2. The feed distributing apparatus as defined in claim 1 wherein each metering receptacles comprises an upwardly opengin trough, each having a vertical longitudinal wall spaced from said one longitudinal edge of the associated shelf section and projecting upwardly beyond the associated shelf section, and each metering trough having a length dimension corresponding substantially to the length dimension of the associated shelf section.

3. The feed distributing apparatus as defined in claim 2 wherein said doors are arranged in end-to-end relationship for closing the lower end of each metering trough, said connecting means for said doors including a door operating mechanism for simultaneously operating all of the doors for each metering trough whereby all of the feed material contained in one metering trough may be simultaneously discharged therefrom.

4. The feed distributing apparatus as defined in claim 1 wherein said endless conveyor means comprises an endless chain conveyor, said conveyor elements each comprising a substantially flat, vertically oriented paddle extending transversely in angular relation from one side of a shelf structure beyond the other side thereof to overlie a metering trough.

5. The feed distributing apparatus as defined in claim 4 wherein said drive means comprises a driven endless chain positioned in close proximity to said chain conveyors, said drive chain having a plurality of drive elements thereon engaging said chain conveyor for driving the same.

6. The feed distributing apparatus as defined in claim 3 wherein said doors for each metering trough are arranged in pairs, each pair having adjacent ends thereof disposed in overlapped relation, each pair of doors being vertically swingably between open and closed positions about horizontal axes extending transversely of the associated metering trough.

7. The feed distributing apparatus as defined in claim 3 wherein said doors for each metering trough are each vertically swingable between open and closed positions about an axis extending longitudinally of the associated metering trough.

8. The apparatus as defined in claim 2 wherein said shelf sections are arranged in rectangular relation and include a pair of spaced apart, substantially parallel longitudinal shelf sections, and a pair of spaced apart substantially parallel transverse shelf sections extending between and interconnected with said longitudinal shelf sections.

9. A feed distributing apparatus adapted to distribute, meter and discharge particulate animal feed into a plurality of animal feeding receptacles, comprising:

a substantially flat horizontal elongate shelf mounted on said apparatus and adapted to receive particulate animal feed thereon from a supply of animal feed, means defining a vertical wall secured to and projecting upwardly therefrom, said shelf adjacent one longitudinal edge thereof, an upwardly opening elongate metering trough mounted on said apparatus and positioned laterally adjacent to and below the other longitudinal edge of said shelf and above the animal feeding receptacles, a plurality of doors mounted on said apparatus and closing the lower portion of said metering trough, means operatively connected with said doors and being operable to selectively open and close said doors to permit animal feed in said metering trough to be discharged by action of gravity into the feed receptacles, endless conveyor means mounted adjacent said shelf and including a plurality of spaced apart conveyor elements connected thereto and being positioned upon and longitudinally movable along the upper surface of the shelf to discharge material laterally from the shelf progressively along the entire length of said other longitudinal edge thereof and into said metering trough and to progressively fill the metering trough longitudinally from one end thereof to the other, and drive means mounted on said apparatus and drivingly engaging said conveyor means for driving the latter.

* * * * *